US006209088B1

(12) United States Patent
Reneris

(10) Patent No.: US 6,209,088 B1
(45) Date of Patent: Mar. 27, 2001

(54) COMPUTER HIBERNATION IMPLEMENTED BY A COMPUTER OPERATING SYSTEM

(75) Inventor: Ken Reneris, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/158,167

(22) Filed: Sep. 21, 1998

(51) Int. Cl.[7] ............................. G06F 15/177; G06F 1/26
(52) U.S. Cl. .................................................. 713/1; 713/300
(58) Field of Search .................................... 713/300, 2, 1

(56) References Cited

U.S. PATENT DOCUMENTS

| 4,143,283 | 3/1979 | Graf et al. ............................. 307/66 |
| 4,234,920 | 11/1980 | Van Ness et al. ..................... 364/200 |
| 4,458,307 | 7/1984 | McAnlis et al. ....................... 364/200 |
| 4,639,864 | 1/1987 | Katzman et al. ...................... 364/200 |
| 4,726,024 | 2/1988 | Guziak et al. ........................... 371/16 |
| 4,819,237 | 4/1989 | Hamilton et al. ....................... 371/66 |
| 5,012,406 | 4/1991 | Martin ................................... 364/200 |
| 5,167,024 | 11/1992 | Smith et al. ........................... 395/375 |
| 5,175,853 | 12/1992 | Kardach et al. ....................... 395/650 |
| 5,218,607 | 6/1993 | Saito et al. ............................. 371/66 |
| 5,230,074 | 7/1993 | Canova, Jr. et al. .................. 395/750 |
| 5,237,692 | 8/1993 | Raasch et al. ......................... 395/725 |
| 5,239,652 | 8/1993 | Seibert et al. ......................... 395/750 |
| 5,241,680 | 8/1993 | Cole et al. ............................. 395/750 |
| 5,269,022 | * 12/1993 | Shinjo ................................. 395/700 |
| 5,287,525 | 2/1994 | Lum et al. ............................ 395/750 |
| 5,297,282 | 3/1994 | Meilak et al. ....................... 3956/700 |
| 5,355,501 | 10/1994 | Gross et al. .......................... 395/750 |
| 5,396,635 | 3/1995 | Fung .................................... 395/800 |
| 5,414,860 | 5/1995 | Canova, Jr. et al. .................. 395/750 |
| 5,430,867 | 7/1995 | Gunji .................................... 395/575 |
| 5,560,024 | 9/1996 | Harper et al. ........................ 395/750 |
| 5,574,920 | 11/1996 | Parry ..................................... 395/750 |
| 5,590,342 | 12/1996 | Marisetty ............................. 395/750 |
| 5,638,541 | 6/1997 | Sadashivaiah ....................... 395/750 |
| 5,715,456 | * 2/1998 | Bennett ................................ 395/652 |
| 5,784,628 | * 7/1998 | Reneris ............................. 395/750.1 |
| 5,835,953 | * 11/1998 | Ohran .................................. 711/162 |

* cited by examiner

Primary Examiner—William Grant
Assistant Examiner—Ronald D Hartman, Jr.
(74) Attorney, Agent, or Firm—Lee & Hayes, PLLC

(57) ABSTRACT

A computer in accordance with the invention includes volatile executable memory and non-volatile secondary storage. An operating system is stored on the secondary storage, and is loaded into executable memory during a computer boot process. The operating system includes a hibernate/awaken function that executes from the executable memory of the computer. The hibernate/awaken function saves the processor state and the executable memory state to the secondary storage prior to a computer power-down and subsequently restores the processor state and the executable memory state from the secondary storage after the computer power-down without rebooting the operating system.

29 Claims, 11 Drawing Sheets

COMPUTER HIBERNATION IMPLEMENTED BY A COMPUTER OPERATING SYSTEM

TECHNICAL FIELD

This invention relates to computers and operating systems that are capable of suspending program execution and saving all volatile state information before the computer is turned off, and of restarting themselves without requiring an operating system reboot when the computer is turned back on.

BACKGROUND OF THE INVENTION

Computers such as conventional personal computers often utilize a time-consuming initialization procedure in order to load and initiate a computer operating system. The operating system for a computer is typically stored on some type of rotating non-volatile media such as a magnetic hard disk. However, the computer's microprocessor executes instructions only from addressable memory such as DRAM or some other type of volatile, electronic memory. In order to initialize this addressable memory, a small amount of non-volatile boot-up memory is typically provided in an EPROM (electronically programmable read-only memory) or similar device. This memory contains code for reading some initial portion of the operating system from the hard disk and loading it into DRAM. This portion of the operating system is then responsible for loading and initializing remaining portions of the operating system. This process is referred to as "booting" the operating system.

After a computer initializes itself or "boots," it is usually in a default state, ready for a user to initiate some program or process. In most cases, the computer is in the same state after every initialization, regardless of a user's past activities. That is, the computer does not "wake up" at the same point at which it was turned off. Rather, the user must reload any applications, documents, or files he or she wishes to use. This can be a significant inconvenience. If a user wishes to turn off his or her computer at the end of a workday, the user must save all work, exit all programs, and shut the computer down. At the beginning of the next day, the user must restart the computer, wait for it to boot, load any applications that were in use the day before (such as email programs, word processing programs, Internet browsers, etc.). Each application typically initializes itself to a default state, and the user must take further steps to load any documents or files that he or she was working with. Assuming, as an example, that the user was revising a text document, the user must load a word processor, load the appropriate document into the work processor, and also attempt to find the place in the document where work was interrupted the day before.

It would be much easier for the user if the computer would simply restart at the same point at which it was turned off. In fact, some computers are able to do this. When using such a computer, a user simply initiates a "hibernate" mode when it is time to turn the computer off. The term hibernate indicates that power is turned off in such a way that the computer is "paused." Thus, when the computer is turned back on, it resumes operation at the same point at which it was turned off. While the computer is turned off power is removed from all or at least most components of the computer.

To hibernate, the computer saves its entire volatile operating state to non-volatile storage (hard disk). Specifically, the computer saves the contents of all volatile DRAM (dynamic random-access memory), all pertinent state information from the computer's microprocessor, and volatile state information from peripheral components within the computer such as video drivers, printer drivers, etc. When the computer is turned back on, it automatically restores the memory contents and other saved state information. This avoids a lengthy boot process and allows a user to begin work immediately, without reinitializing application programs and documents.

"Hibernation" or "sleep" modes have been implemented primarily in portable computers. One reason for this is that such computers are typically "closed" from a hardware standpoint, meaning that computer hardware exists in a known and constant configuration—it cannot be changed or significantly reconfigured by a user. The code that implements the hibernation function resides in EPROM along with boot code. When it is time for hibernation, the processor jumps to code within the EPROM that is tailored very specifically to the known hardware of the computer. The EPROM code knows exactly what type of hard disk it needs to write to and exactly what internal peripherals need to have their states saved. Furthermore, the EPROM hibernation code can be written so that its execution does not affect the contents of DRAM, which must be saved to disk in an unaltered state. The problem with this approach is that it must be customized for every hardware configuration. For this reason, it has not been widely used. Most desktop computers do not provide a hibernation function.

SUMMARY OF THE INVENTION

A computer in accordance with the invention includes volatile executable memory and non-volatile secondary storage such as a hard disk. An operating system is stored on the secondary storage, and is loaded into executable memory during a computer boot process. The operating system includes a hibernate/awaken function that executes from the volatile executable memory of the computer, rather than from the computer's EPROM. The hibernate/awaken function saves the processor state and the executable memory state to the secondary storage prior to a computer power-down and subsequently restores the processor state and the executable memory state from the secondary storage after the computer power-down without rebooting the operating system. Because the hibernate/awaken function is implemented within the operating system, it is available on any computer capable of running the operating system—the hibernate/awaken function does not rely on the computer's EPROM code for its functionality.

There is a potential problem arising from the fact that the hibernate/awaken function executes from the very memory space that is being saved to secondary storage. This could cause the memory to change during the write process itself, which would be fatal to the hibernation process-the hibernation process relies on the ability to write a memory image representing the entire memory state at a particular instant in time. To solve this potential problem, the hibernate/awaken function first identifies areas of the executable memory that will potentially change during the step of saving the memory to secondary storage. Once these areas are identified, they are duplicated into free areas of executable memory, in a small code loop. When the memory is subsequently written to secondary storage, the duplicated data is written in place of the data that was identified as being subject to change. Thus, a "snapshot" of memory is preserved and written to disk.

Another potential problem arises when restoring the executable memory, because of the necessity of executing restoration code from the very memory space that is being restored. This is solved by allocating temporary "scratch" memory areas before initiating the write process described above. The allocated memory is left un-used by the executing system and therefore does not contain any data that needs to be saved or restored. During restoration, a loader is executed from known locations in memory. It restores individual pages from secondary storage to executable memory. If the loader encounters a page that would overwrite the loader, that page is written to one of the scratch memory areas that does not overwrite the loader. After all pages have been retrieved from secondary storage, a small code loop copies the pages stored in the scratch areas back to their proper locations in executable memory. After memory has been restored in this manner, the computer continues operations from the point where operations were suspended in response to the hibernate/awaken function.

DETAILED DESCRIPTION

Figure 1:
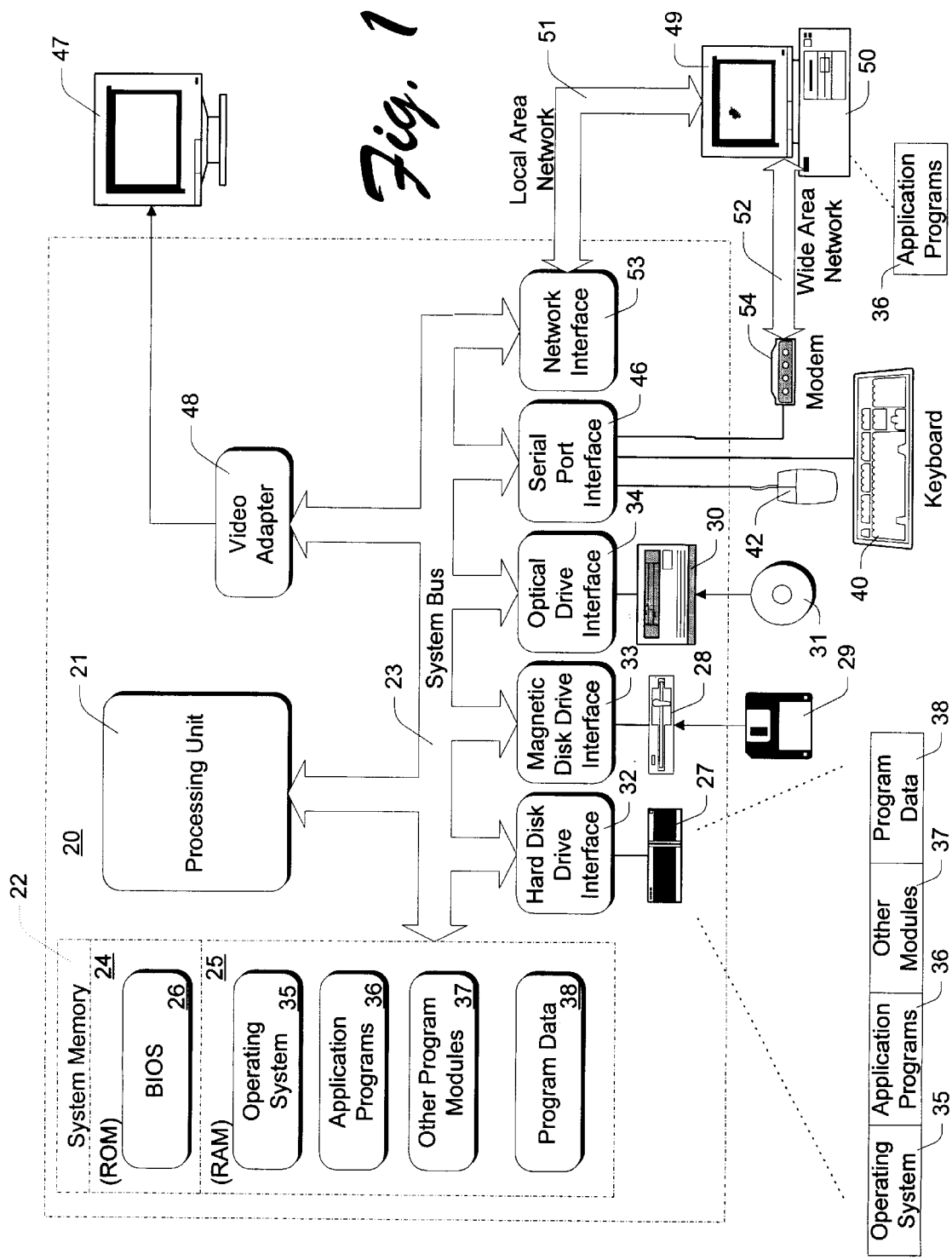
FIG. 1 is a block diagram showing an exemplary operating environment suitable for the invention.

FIG. 1 and the related discussion are intended to provide a brief, general description of a suitable computing environment in which the invention may be implemented. Although not required, the invention will be described in the general context of computer-executable instructions, such as programs and program modules, that are executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by remote processing devices that are linked through a communications network. In a distributed computer environment, program modules may be located in both local and remote memory storage devices.

An exemplary system for implementing the invention includes a general purpose computing device in the form of a conventional personal computer 20, including one or more microprocessors or other processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM or EPROM) 24 and random access memory (RAM) 25. A basic input/output system 26 (BIOS), containing the basic routines for system initialization and initial boot functions, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible locally or remotely by a computer, such as magnetic cassettes, flash memory cards, digital video disks, Bernoulli cartridges, random access memories (RAMs) read only memories (ROM), and the like, may also be used in the exemplary operating environment.

RAM 25 forms executable memory, which is defined herein as physical, directly-addressable memory that a microprocessor accesses to retrieve and execute instructions. This memory can also be used for storing data as programs execute. Accordingly, normal operation of the microprocessor results in both a changing processor state and a changing executable memory state.

Executable memory is generally volatile, meaning that it loses its contents when power is cycled. Executable memory is commonly organized as portions or areas that are referred to as blocks or pages. Within a particular computer, using a particular operating system, there is a fundamental memory block or page size utilized by a virtual memory operating system. The low-level memory manager within the operating system typically allocates memory by memory pages. Allocatable memory areas will be referred to as pages in the following discussion.

Computer 20 also has secondary, non-volatile memory media, primarily in the form of hard disk drive 27. A computer's secondary memory is often used for long-term storage of data and programs, and to expand virtual memory beyond the size of executable memory. Secondary memory is not directly addressable by a microprocessor in the same way that executable memory is addressable. Rather, a microprocessor executes specially written code from executable memory in order to read from or write to secondary storage. Secondary memory includes local devices such as hard disks, but can also include remote storage devices accessible through networks.

A number of programs and/or program modules may be stored on the hard disk, magnetic disk 29 optical disk 31, ROM 24, or RAM 25, including an operating system 35, one or more application programs 36, other program modules 37, and program data 38. A user may enter commands and information into the personal computer 20 through input devices such as keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, personal computers typically include other peripheral output devices (not shown) such as speakers and printers.

The operating system is initially stored on secondary storage. However, the processor 21 is programmed through BIOS 26 (also referred to as a boot ROM or boot EPROM) to load an initial small piece of the operating system from secondary storage and to transfer control to it. This piece then continues the load process until the required portions of the operating system are present in volatile executable memory.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. Alternatively, a LAN connection might also provide a connection to a WAN, independently of a modem. In a networked environment, program modules depicted relative to the personal computer 20, or portions thereof, may be stored in the remote memory storage device. It will be appreciated that the network connections shown are exemplary and other means of establishing a communications link between the computers may be used.

The illustrated computer uses an operating system such as the "Windows NT" operating system available from Microsoft Corporation. An operating system of this type can be configured to run on computers having various different hardware configurations, by providing appropriate software drivers for different hardware components.

In accordance with the invention, the operating system 35 of computer 20 implements a "hibernate/awaken" function. The term "hibernate" indicates that power is turned off in such a way that the computer is "paused." While the computer is turned off, power is removed from all or most components of the computer. When the computer is turned back on or "awakened," it is returned to normal operation at the same point at which it was turned off.

The hibernate function, invoked just prior to turning off the computer, interrupts all program execution and saves any computer state information that would otherwise be lost during a power-down to non-volatile storage. This includes but is not limited to the state of executable memory, the state of peripheral devices and their drivers, and the execution context of the computer's processors. When power is restored to the computer, the awaken function is invoked to restore the previously saved state information, and to resume program execution at the point where it was interrupted, without rebooting the operating system.

The hibernate/awaken function is implemented generically, within the operating system, so that it will function on many different computers having many different hardware and software configurations. The hibernate/awaken function executes from volatile executable memory rather than from non-volatile memory such as EPROM. More specifically, parts of the awaken function are implemented by code that is loaded from secondary storage and that executes from the same executable address space that is used by the operating system and that is used by application programs initiated by the operating system.

Figure 2:
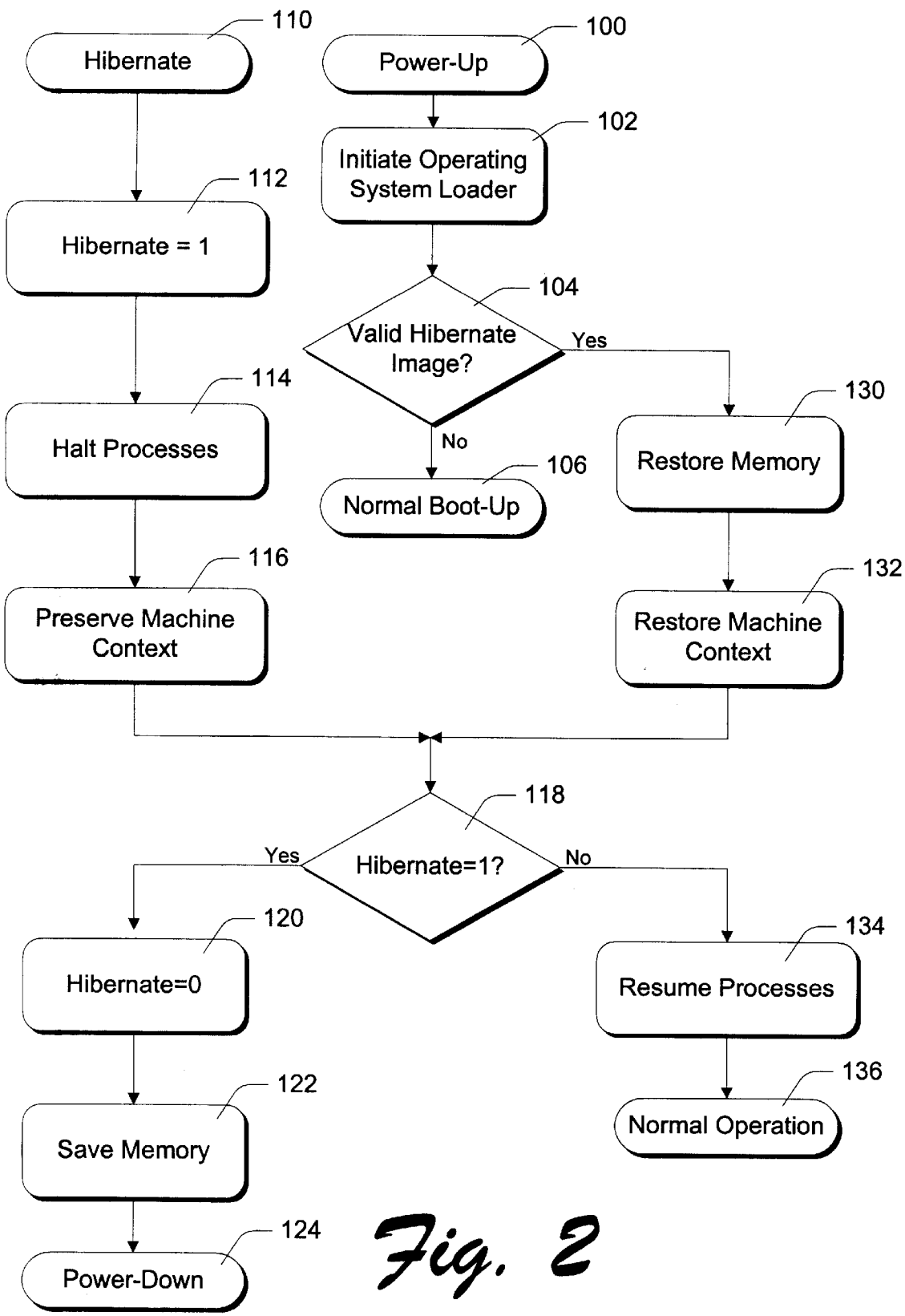
FIG. 2 is a flowchart showing general steps performed in accordance with the invention.

FIG. 2 shows general operations that are performed in implementing the hibernate/awaken function on a computer such as described above. FIG. 2 shows only an overview of the process-more detailed steps will be given with reference to following figures.

FIG. 2 begins with a step 100 of turning the computer on. Upon power-up, a step 102 is performed of initiating an operating system loader that has been itself loaded from secondary storage. A step 104, performed by the operating system loader, comprises determining whether a valid hibernation file has previously been saved to secondary storage. If it has not, an operating system boot-up sequence 106 is performed, which includes booting an operating system from secondary storage and executing the operating system from volatile executable memory.

If a valid hibernation file is found on secondary storage, "awaken" steps are performed. These steps will be described below, after first describing the "hibernate" steps.

After boot-up step 106, the computer operates normally. A user can initiate various application programs. The operating system loads the application programs from secondary storage and executes them from volatile memory. At some point, the hibernation function is requested. The invocation of the hibernation function is shown in FIG. 2 as block 110. Hibernation can be initiated in different ways, such as by a specific user command, by the passing of a predefined duration without computer activity, or by some mechanical event such as closing the clamshell lid of a laptop computer.

A step 112 comprises setting a hibernate variable to 1. This is used in a subsequent step to determine whether the computer is in the process of hibernating or of awakening. The need for this variable will become apparent as the discussion proceeds.

A step 114 comprises halting all computer processes other than the hibernation process. In a multiprocessor system, the hibernation process itself is performed by a designated one of the processors. In the described embodiment, the process is performed by the computer's boot system processor (BSP). The hibernation process is given the highest available priority level, effectively preventing the processor from performing any other tasks. In addition, other system processors, referred to as auxiliary system processors (ASPs), are "collected" by assigning them to high-priority processes in which the processors loop continuously, waiting for further instructions from the boot system processor.

A step 116 comprises saving the machine context. Primarily, this involves recording the context (register sets) of the system processors and any volatile information maintained by devices and device drivers, that would otherwise be lost during a power-down.

Execution then proceeds with a decision step 118, which evaluates whether the hibernate variable is equal to 1. If it is, this indicates that the hibernate process is underway, and execution proceeds with step 120. Step 120 comprises setting the hibernation variable to 0. A step 122 is then performed of saving the computer's volatile, executable memory to secondary storage, creating the hibernation file mentioned with respect to step 104. In addition, the hibernation file contains a separate description of the processor context of at least the boot system processor. After step 122, the computer is turned off in a step 124.

An overview of the "awaken" steps will now be given, with reference again to FIG. 2. The computer is turned on in step 100 and the operating system loader begins in step 102. Step 104 comprises determining whether a valid hibernation file resides on secondary storage. Following a successful hibernation, as already described, this result of this step will be true, so execution branches to step 130. Step 130 comprises restoring executable memory contents from the hibernation file. Following step 132 comprises restoring the context of the boot system processor. Specifically, this involves restoring the register set of the processor, including its program counter, so that the processor ends up in exactly the same state as it was during step 116, during the hibernation process. Depending on the particular microprocessor architecture used by computer 20, it may be necessary to manipulate virtual memory pointer tables to transition back to the execution thread that was executing when the processor was interrupted.

At this point, there is potential ambiguity (from the processor's perspective) regarding which of steps 116 and 132 has just been completed, since the processor state is identical in either case. To determine whether it is performing the hibernation function or the awaken function, the processor examines the previously saved hibernation variable in step 118. Since the hibernation was previously completed, the hibernation variable has been set to 0 in step 120, and execution therefore branches to step 134. Step 134 comprises resuming any processes that were halted in step 114. The auxiliary system processors are released from their high-priority processes and allowed to continue with their previously-assigned processes. The boot system processor is likewise released to continue with its previously assigned processes. The computer has now been restored to its normal execution state, as it was before invocation of the hibernation function. This is indicated by block 136.

Figure 3:
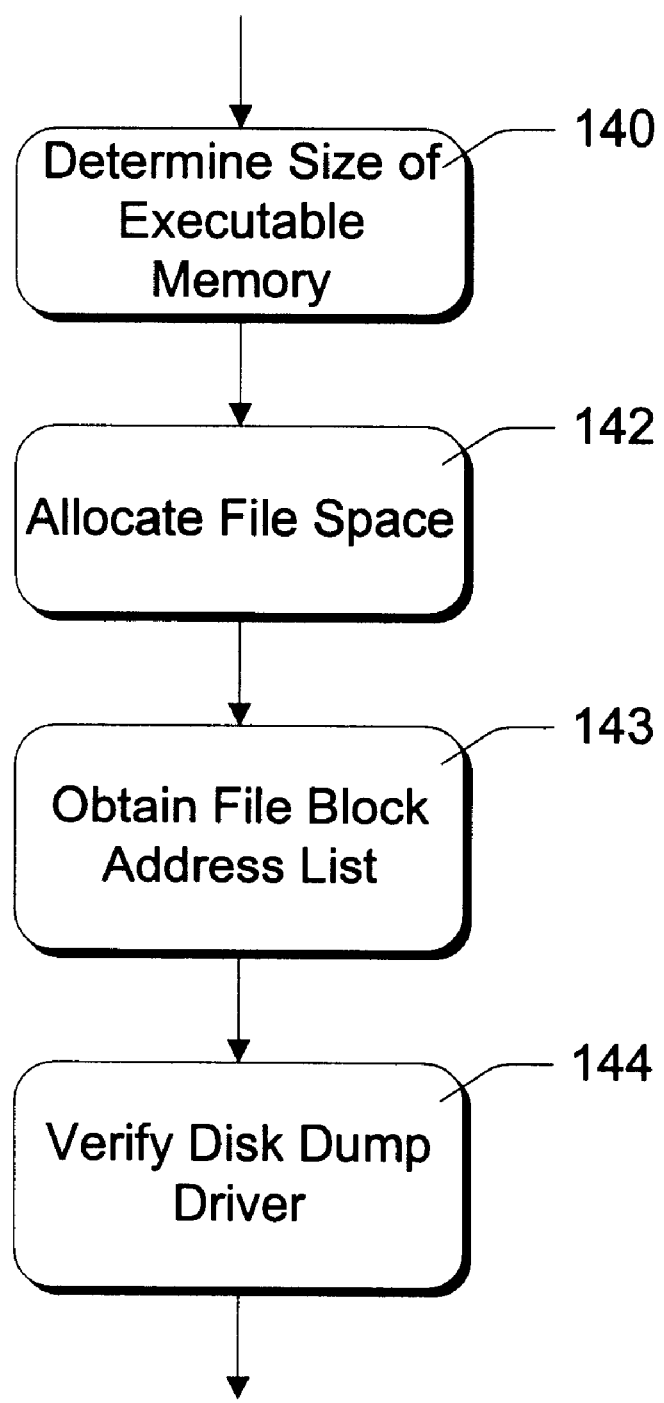
FIG. 3 is a flowchart showing steps performed in an initialization stage of the invention.

The invention will now be described in more detail. FIG. 3 illustrates steps performed in an initialization stage of the invention, performed either at the time hibernation is enabled (if it was not previously enabled) or when the operating system boots (if hibernation was previously enabled). During the initialization stage, the operating system allocates and reserves file space for the contents of the computer's executable memory. A first step 140 comprises determining the size of the computer's executable memory. A subsequent step 142 comprises allocating or reallocating file space from secondary storage. The total amount of allocated file space is equal to the size of executable memory, plus some known amount of additional space required to store ancillary data related to the hibernation and restore processes. If the file space has already been allocated, this step comprises verifying the size and location of the file space. If the size of executable memory has changed since the last boot, the size of the allocated file space is changed.

The file space, referred to herein as a hibernation file, is allocated using conventional operating system calls. A step 143 comprises obtaining a file block address list (referred to in Windows NT as an MCB list) through conventional executive operating system calls. The file block address list is a map of the logical block addresses where the hibernation file resides on the secondary storage. The logical block addresses can be used by low-level device drivers to write directly to and read directly from secondary storage, in order to access contents of the hibernation file, bypassing the normal file system used by the operating system.

In the described embodiment, the allocated space is located on the disk drive containing Windows NT's "Win32" directory—the system disk. The system disk is guaranteed to be accessible by the operating system loader for subsequent restoration steps.

A step 144 comprises verifying a simplified, alternative disk driver or stack instead of the primary disk driver used during normal operations by the operating system. The write phase described below uses this alternative disk driver to control and contain the use of executable memory while saving state information to secondary storage. This disk stack includes a conventional Windows NT miniport driver, corresponding to whatever actual disk hardware is used in the computer. However, the disk stack uses a customized Windows NT class disk driver, referred to as a disk dump driver, that is carefully tailored to use only limited and clearly identified portions of memory. To achieve this, the disk dump driver provides only limited functionality. For example, it can handle only a single disk access request at a time. Furthermore, it does not utilize the Windows NT file system. Rather, it performs write operations at specified logical disk blocks, as specified in the file block address list described above.

Verification step 144 comprises loading the alternative disk stack and verifying that it can properly write to the system disk. After this verification, the alternative disk stack is unloaded and operation of the computer proceeds as normal. Note that the verification step might not be necessary in some implementations. Rather, in such implementations it might be possible to simply assume that the alternative disk stack can write to the system disk.

Figure 4:
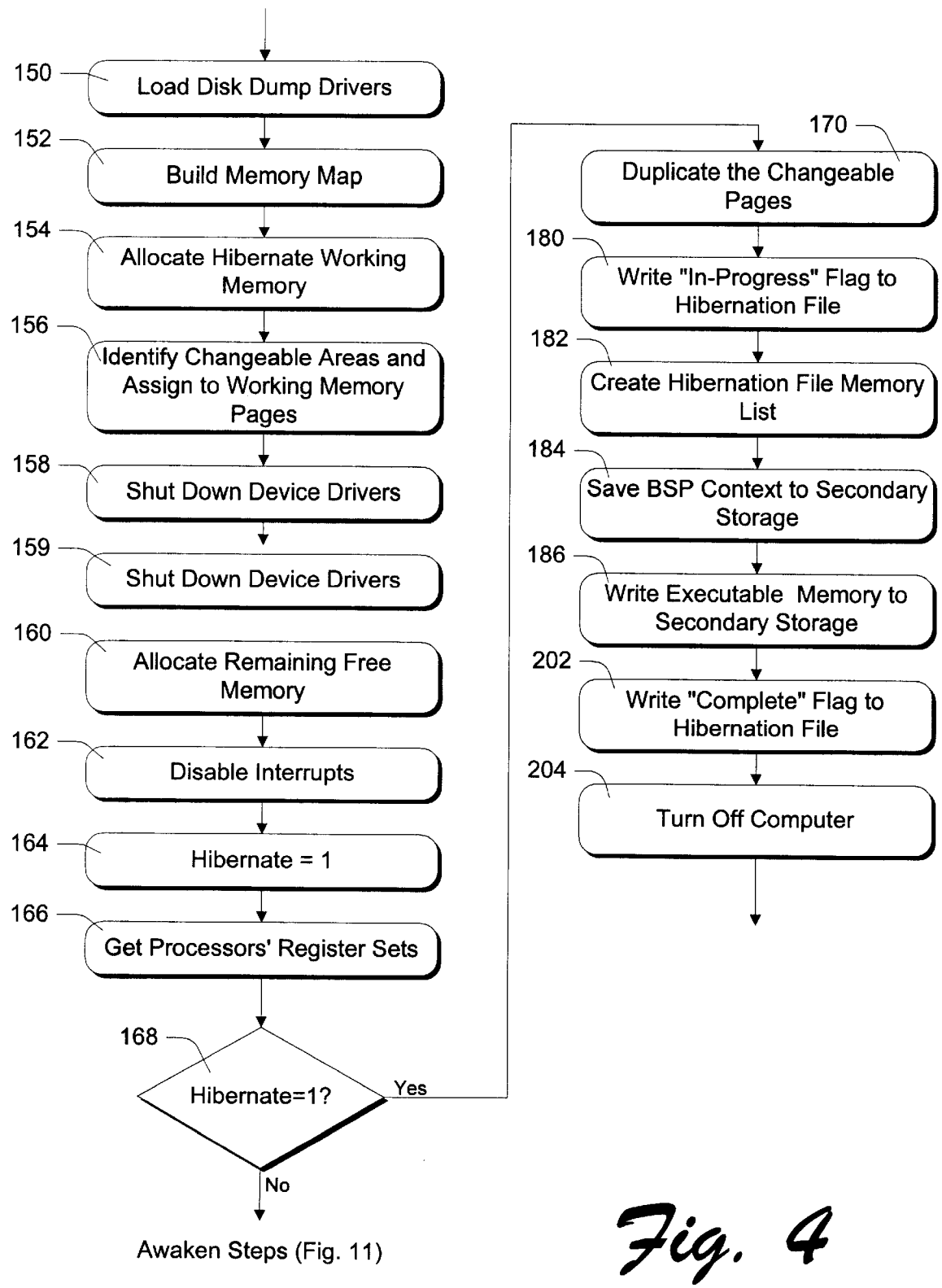
FIG. 4 is a flowchart showing steps performed in a preparation stage of the invention

FIG. 4 shows detailed steps performed upon invocation of the hibernation function. Various memory examination, allocation, and copying steps are performed before actually writing to the contents of the executable memory to the hibernation file. Such steps are performed in order to account for the fact that the subsequent write-to-file function will be implemented by code that itself executes from the executable memory. Because the hibernation function executes from executable memory, portions of this memory (such as data pages used for storing certain variables) will be subject to change during the write process itself.

In accordance with the invention, the subsequent write phase uses a simplified disk driver stack (the disk dump driver verified in step 144) that is nearly self-contained. This limits the parts of memory that are subject to change, and also makes them easy to identify. (changeable areas include certain data portions of the hardware abstraction layer (HAL); specific data areas of the operating system kernel; processor stack regions; processor control regions (PCRs); processor control blocks (PRCBs); and data areas used by the disk dump driver stack. The steps shown in FIG. 4 ensure that the state information being written to secondary storage represents a "snapshot" taken at a particular instant when the computer is effectively halted.

An initial step 150 comprises installing the disk dump driver stack described above.

A step 152 comprises building a memory map of physical memory, referred to herein as a memory save map. This map will eventually contain a list of all physical page numbers corresponding to pages of physical memory that need to be written to the hibernation file. In addition, the memory save map contains further information about particular memory pages, that will be described below. Initially, as a result of step 159, the memory save map indicates all available pages of physical memory.

A step 154 comprises allocating physical memory for use in the hibernate process, referred to herein as hibernate working memory. The allocated memory does not have to be formed by contiguous pages. The memory is obtained by calling the operating system memory manager to obtain memory descriptor lists. The memory descriptor lists indicate physical page numbers of the allocated pages in executable memory.

The hibernate working memory is used for various purposes, described below, during the hibernate process. However, the contents of this memory are not needed after the hibernation process or during the subsequent awaken process. Accordingly, this memory does not need to be saved to secondary storage. Therefore, the pages that form the hibernate working memory are removed from the memory save map and recorded in a working memory page list maintained by the hibernation function.

Since hibernate working memory is not saved to secondary storage, there is no need to restore it during the awaken process. During the awaken process, these physical memory pages are "free" or "empty," and can be used for other purposes. As described in more detail below, they are used during the awaken process to accommodate an awaken loader. Accordingly, the hibernate working memory needs to be at least as large as the awaken loader. In the described embodiment of the invention, the awaken loader is about 2 megabytes, and the hibernate working memory is therefore allocated with an initial size of 2 megabytes. If more physical memory is needed during the hibernation process, it is allocated, removed from the memory save map, and added to the working memory page list.

A step 156 comprises identifying the areas or pages of the executable memory that will potentially change during the subsequent write phase, when the executable memory is actually being saved to disk. Before beginning the write phase, these pages will be copied or duplicated in assigned pages of the hibernate working memory, thus creating a snapshot of memory as it exists prior to the actual write phase. Thus, step 156 includes recording, in the memory save map, an assignment of each changeable page to a duplicate page in the hibernate working memory. The changeable pages are not actually duplicated at this time (see step 170 below).

Step 158 comprises instructing all operating system device drivers to save their state information to executable memory. In accordance with the invention, all operating system device drivers are designed to accept such instructions, and to respond by flushing their queues, saving any internal state information to the computer's volatile executable memory, and turning off power to their associated drivers (if possible) in preparation for computer shutdown. In addition, the devices queue any further I/O requests until notified by the operating system to resume operation. If any of the device drivers return an error, the hibernate operation is aborted. This device driver feature is described in detail in two US Patent applications which are hereby incorporated by reference: U.S. Pat. Ser. No. 08/810,018, entitled "A System and Method for Managing Power Consumption in a Computer System, filed Mar. 3, 1997; and U.S. Pat. application Ser. No. 08/614,186, entitled "Integrated Power Management System," filed Mar. 12, 1996.

Step 160 comprises allocating all remaining free physical memory. This is accomplished by querying the memory manager to find how many pages of physical memory are available, and then requesting most of this remaining memory. This step is performed iteratively until the remaining free physical memory has been allocated. These allocated pages are removed from the memory save map, and added to the working memory page list.

A step 159 comprises collecting all processors in the computer, other than the boot system processor which is already executing the hibernation process. Collecting the processors means that they are assigned to high-priority loops in which they wait for further instructions from the boot system processor, and in which they are not allowed to perform any further paging and/or memory allocation operations. In the NT embodiment, the high-priority is assigned to the processor loops by setting the loop processes to the dispatch interrupt priority level, which is specifically referred to as the "DPC_level". The hibernation process itself, performed by the boot system processor, is also assigned to the dispatch interrupt priority level.

A step 162 comprises disabling all interrupts. The boot system processor disables its own interrupts, and instructs the auxiliary system processors to disable their interrupts. This, in combination with the collecting step 159 above, halts all processes other than the hibernation process.

A step 164 comprises setting the hibernation variable to 1, indicating that the hibernation function is taking place.

Step 166 comprises capturing the contexts of the respective system processors. The contexts, consisting of register sets, are saved in portions of executable memory other than the hibernate working memory—in memory pages that will subsequently be saved to secondary storage. Step 166 involves a small amount of code that is tailored for the specific microprocessors used by the computer.

After capturing the processor contexts, step 168, corresponding to step 118 of FIG. 2, is performed. This step comprises checking the hibernate variable to determine whether hibernation is in process. If it is not, executing proceeds with awaken steps which will be described below in conjunction with FIG. 11. If the hibernation variable indicates that hibernation is in progress, further hibernation steps are performed, including steps that write contents of executable memory to secondary storage.

Step 170 comprises duplicating the changeable pages identified in step 156 to pages of the hibernation working memory. This is accomplished with reference to the memory save map, which identifies the changeable pages and the corresponding pages of hibernation working memory in which copies should be made. Thus, this step involves simply copying the data from the changeable pages to corresponding pages in the hibernate working memory, in accordance with the memory save map. This step is performed in a very small, self-contained code module that does not affect any other memory and that does not access secondary storage. This step essentially preserves a "snapshot" of changeable memory as that memory exists at the time of shutdown. Even though the original memory in the changeable areas might be altered during subsequent write-to-disk procedures, the snapshot will remain unchanged.

Figure 5:
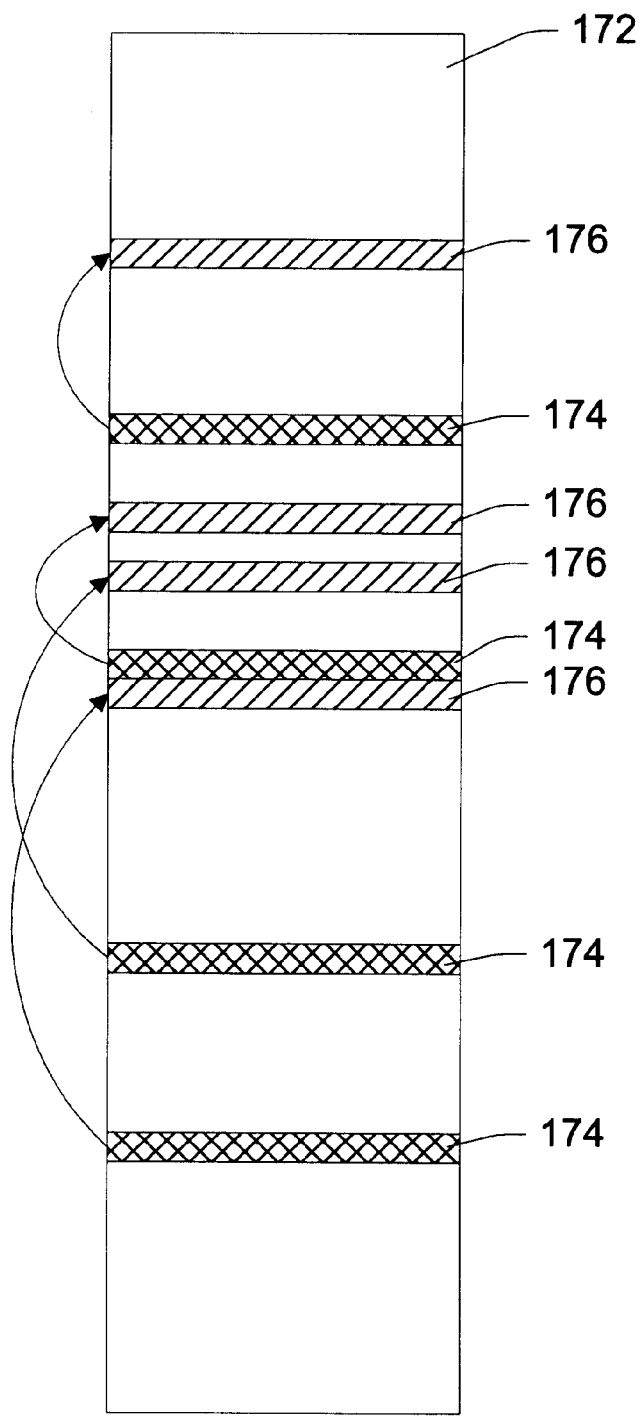
FIG. 5 shows executable memory areas allocated and utilized by the steps of FIG. 4.

FIG. 5 illustrates the effect of this process. FIG. 5 shows executable memory, referenced by numeral 172. Identified changeable areas of this memory are also shown, identified by reference numerals 174. In addition, corresponding pages 176 of hibernate working memory are shown. Arrows indicate that changeable pages are copied to duplicate pages in the hibernate working memory.

Returning to FIG. 4, a step 180 comprises writing a flag to the header of the hibernation file indicating that the write stage is in progress. A step 182 comprises creating a hibernation file memory list, in the hibernation file, containing page numbers from the working memory page list. These are pages that will not have to be restored during the awaken process. In practice, this list contains page numbers corresponding to a limited amount of the hibernate working memory—enough to accommodate the awaken process loader during the subsequent awaken process. In this embodiment of the invention, the hibernation file memory list contains physical page numbers corresponding to 2 megabytes of physical memory.

A step 184 comprises saving the context (register set) of the boot system processor to the hibernation file. This context was previously captured in step 160. It is not necessary to write the contexts of the auxiliary system processors to the hibernation file. Rather, those contexts are stored in areas of executable memory that are saved to secondary storage in step 186, below.

Step 186 comprises writing executable memory to the hibernation file, in secondary storage. The writing step saves individual memory pages to secondary storage, along with an index of the physical addresses of the memory pages so that the pages can be subsequently restored to their original locations in executable memory. Only the pages indicated by the memory save map are written in this step.

Figure 6:
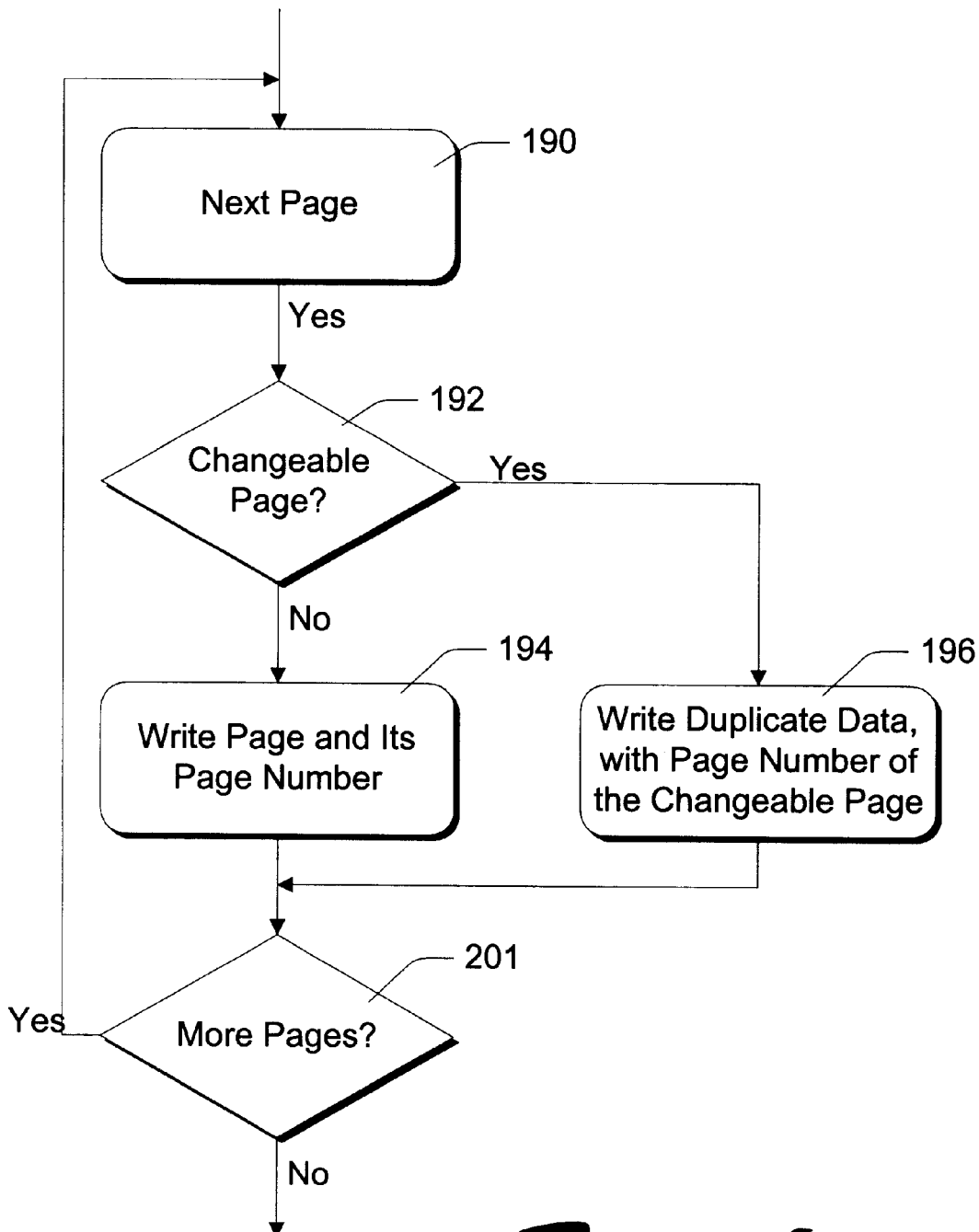
FIG. 6 is a flowchart showing steps performed in a write stage of the invention.

Step 186 is accomplished using steps illustrated in FIG. 6. The process shown by FIG. 6 includes a tight, self-contained code loop to write the contents of executable memory to disk. As the memory pages are written to disk, their physical addresses are also recorded. However, portions of memory that were previously identified as being subject to change during this write process are not written. Instead, the corresponding duplicated areas are written in their place. When the duplicate pages are written, however, they are recorded as originating from their original physical addresses—the addresses to which they are to be restored—rather than from the addresses at which they have been duplicated.

Step 190 begins the tight loop that writes executable memory to secondary storage. It is a reference to the memory save map for the page number of the next physical memory page that is to be saved to secondary storage. A step 192 is a decision regarding whether the memory page is "changeable"; that is, whether it is one of the pages identified in step 156 as being subject to change in the write process. Whether a page is changeable is indicated by the memory save map, along with the page number of the page containing the "snapshot" of the changeable page. If the page is not changeable, step 194 is executed. Step 194 comprises writing the page to secondary storage along with the physical address or page number of the memory page. If the page is changeable, step 196 is performed of writing the changeable page's duplicate data, from the corresponding duplicate page created in step 170, in place of the changeable page and its data—but with the physical address of the changeable memory page.

Figure 7:
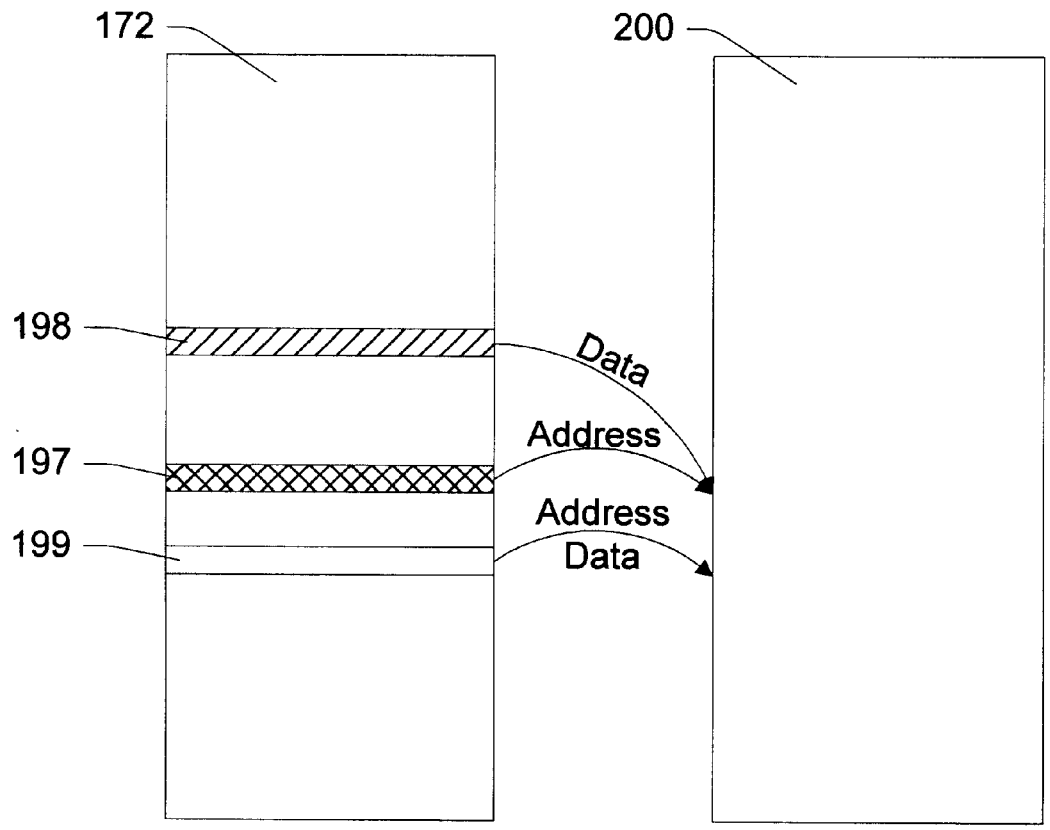
FIG. 7 illustrates steps of writing memory pages from executable memory to secondary storage.

FIG. 7 illustrates this process, showing executable memory 25, a changeable memory page 197, its corresponding duplicate memory page 198, and a non-changeable page 199. The data and page address of non-changeable page 199 are written to the hibernation file (indicated by reference numeral 200) without modification. However, the data of duplicate page 198 is written to the hibernation file 200 in place of changeable page 197, along with the page address of changeable page 197.

Returning to FIG. 6, step 201 checks whether all memory pages listed in the memory save map have been processed. If they have, step 186 of FIG. 4 is complete. Step 202 is performed of modifying the hibernation file header to indicate that the file has now been completely written, rather than being in progress (step 180). The computer is then turned off in a step 204, which may be manual or automatic.

If the result of step 201 in FIG. 6 is true, execution returns to step 190, which finds the next executable memory page listed in the memory save map, and writes it to the hibernation file as described above.

In this way, executable memory is written page by page into the disk space allocated in step 142 (FIG. 3). A header structure and content index is created and maintained in this same file to keep track of each page and its corresponding physical address in executable memory. Checksums are utilized to detect errors during subsequent restoration procedures. The header structure also contains a table (the hibernation file memory list) that indicates a set of pages that are not being written in the hibernation file. A flag is maintained in the header structure, indicating whether a valid memory image has been saved on disk. The flag indicates either (a) that the hibernation file has been completely written and therefore contains a valid hibernation image; (b) that the hibernation file is currently being written (or was interrupted while being written) and therefore does not contain a valid hibernation image; that the hibernation file is currently being restored as part of an awaken process; or (d) that the hibernation file has not been written with a valid hibernation image. Note that a normal system shutdown, without invoking the hibernation function, clears the flag so that it indicates the absence of a valid hibernation image.

The awaken function is now described. With reference to FIG. 2, a step 104, performed after the computer is turned on, determines whether there is a valid memory image that needs to be restored. To do this, the operating system loader examines the hibernation file created during the hibernation process, and the flag maintained in the hibernation file that indicates whether a valid memory image has been stored. If a valid memory image exists in the hibernation file, the operating system loader begins restoration steps, beginning at a step 130. This step comprises restoring the contents of executable memory from the hibernation file.

When restoring pages of executable memory, some of the saved pages will need to be restored to pages already occupied by the operating system loader. This conflict is handled by first identifying those pages of physical memory occupied by the operating system loader. Corresponding pages from the hibernation file are then restored to temporary, scratch pages identified by the hibernation file memory list. A mapping is maintained in further scratch pages, indicating the ultimate desired locations of the conflicting pages. After all pages have been restored from the hibernation file (both those that do and those that do not collide with the operating system loader), a relocatable awaken loader is loaded into another scratch page of executable memory (again, one whose page number is recorded in the hibernation file memory list). Control is then transferred to the awaken loader, which copies the conflicting pages from the scratch pages into their proper memory locations, overwriting the operating system loader.

Figure 8:
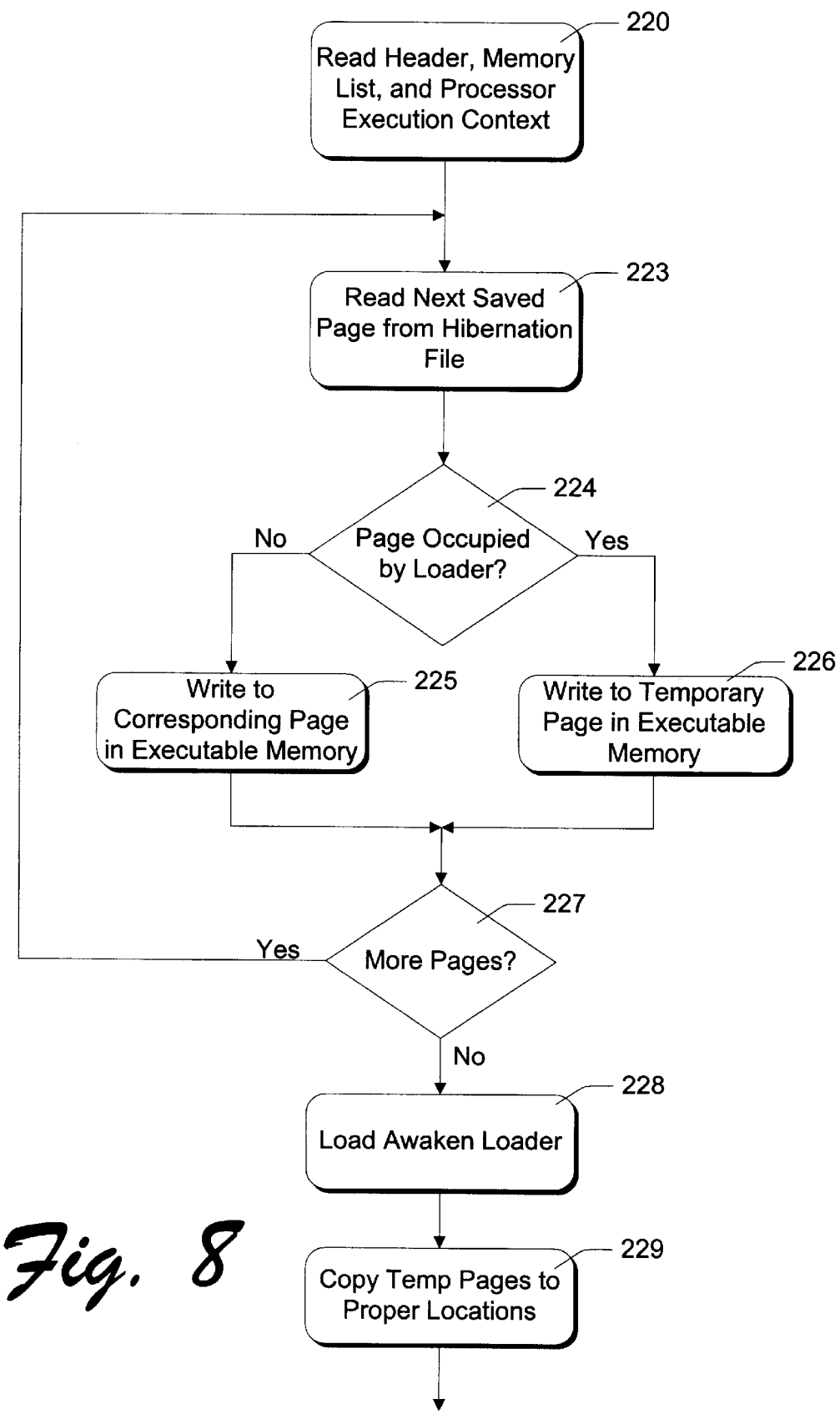
FIG. 8 is a flowchart showing steps performed in a restoration stage of the invention.

Step 130 is shown in more detail in FIG. 8. A step 220 comprises accessing the hibernation file reading information from the hibernation file, including its header, the hibernation file memory list, and the execution context of the boot system processor. After this, a loop is performed to restore individual pages from the hibernation file to physical memory. A step 223 comprises reading the first saved executable memory page and its physical memory address from the hibernation file. A decision 224 is made regarding whether the memory page has a physical memory address that collides with memory being used by the operating system loader itself. If the result of this test is false, step 225 is performed of simply restoring the memory page to its proper location in executable memory. Otherwise, if the result of test 224 is true, a step 226 is performed of temporarily writing the memory page to one of the "scratch" or temporary areas identified by the hibernation file memory list. While this is being done, the operating system loader builds an array indicating mappings between temporary locations and the corresponding final memory locations. As indicated by block 227, steps 223–226 are repeated for all memory pages contained in the hibernation file.

A step 228 comprises loading a relocatable module of code, referred to as an awaken loader, into an area of scratch memory. This awaken loader can execute from any base address. It is a very small code module that performs a step 229 of copying the temporary pages of the executable memory to their actual, original locations (as indicated by the array mentioned above), potentially overwriting the operating system loader in the process.

Figure 9:
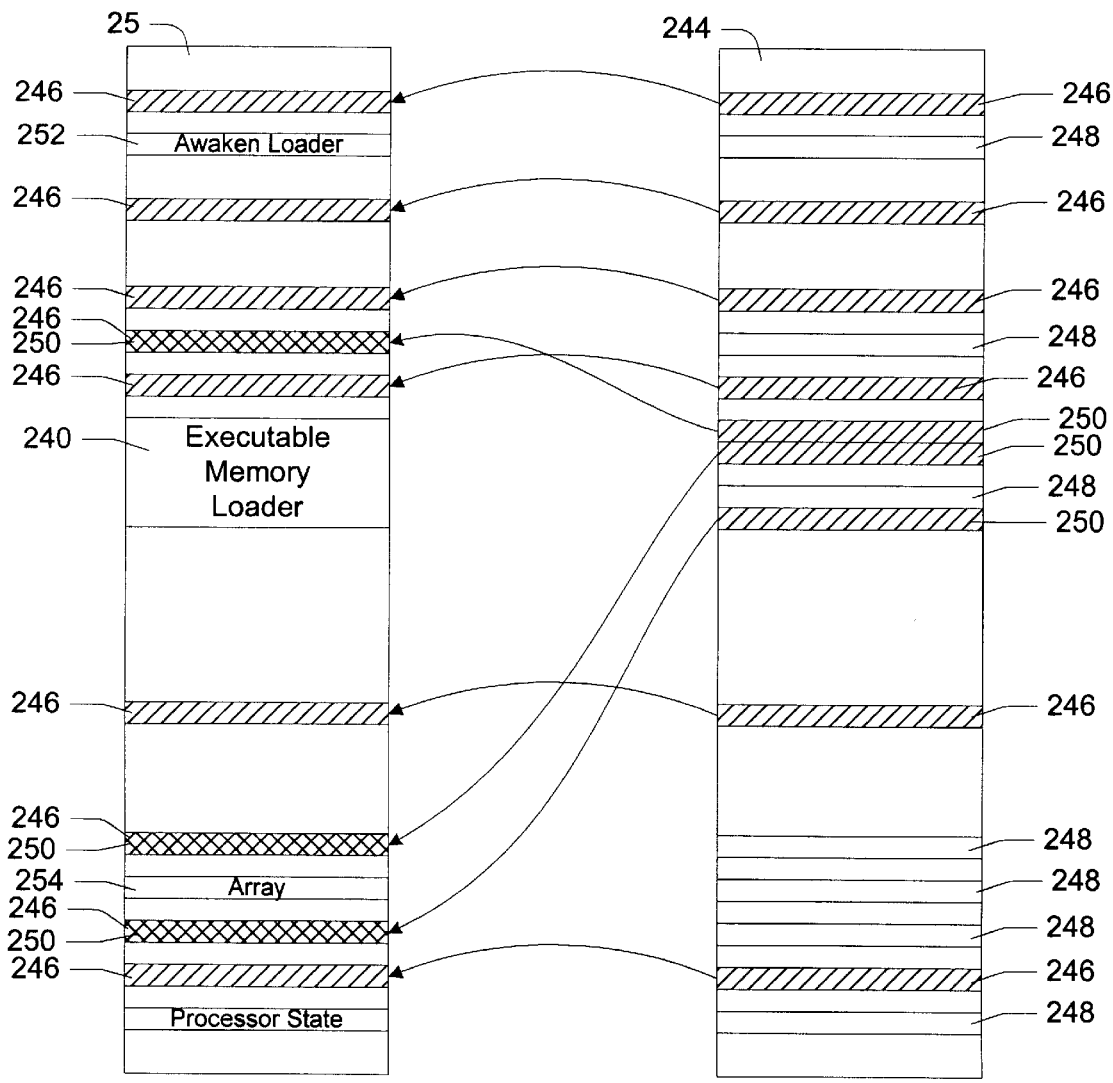
FIG. 9 illustrates steps of restoring memory pages from secondary storage to executable memory in accordance with FIG. 8.
Figure 10:
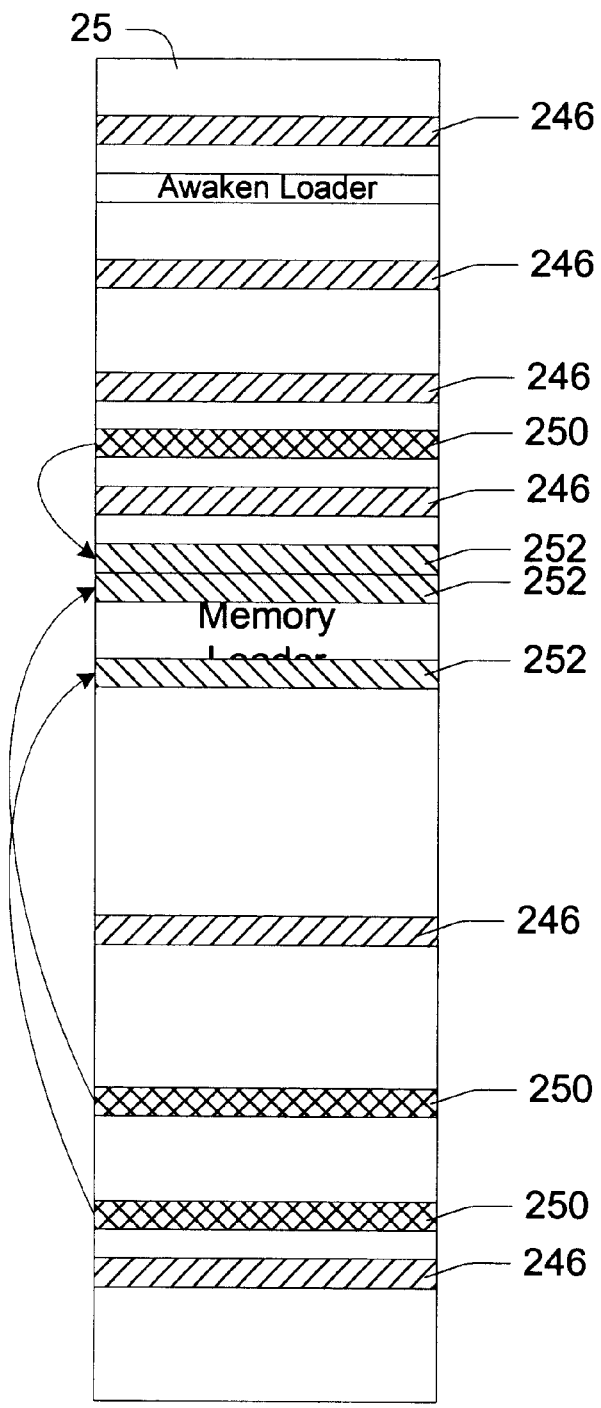
FIG. 10 is a flowchart showing further steps performed in a restoration stage of the invention.

FIG. 9 and 10 illustrate the steps described above with reference to FIG. 8. FIG. 9 shows executable memory 25 including a contiguous area 240 in which the operating system loader and its data are positioned. Although the memory is shown as being contiguous for purposes of illustration, the loader actually occupies a plurality of different regions within executable memory 25. The locations of the loader are arbitrary, but identifiable. It is likely that some of these areas of memory will need to be overwritten as part of the restoration process.

FIG. 9 shows a saved memory image 244, as reflected by the contents of the hibernation file. The hibernation file defines a plurality of saved memory pages 246, as well as a plurality of free, "scratch" areas 248. These areas are the areas that were previously allocated in step, during the preparation stage prior to actual hibernation, and which are identified in the hibernation file memory list. The hibernation process allocated but did not save these pages, therefore it is known that they are free for use as scratch pages during the awaken process.

Three of the saved memory pages shown in FIG. 9 are at locations already occupied by memory loader 240 in physical memory 25. These saved memory pages are indicated by reference numeral 250.

Now, in accordance with the steps described with reference to FIG. 8, any saved memory pages 246 that do not collide with the operating system loader are copied into their proper locations in physical memory 25. However, saved memory pages 250 that would collide with the operating system loader are copied to alternate locations, corresponding to scratch areas 248 of the saved memory image 244. In addition, a memory loader is loaded into a physical memory page 252 that corresponds to a scratch area 248 of the saved memory image.

An array is maintained in yet another temporary memory page 254, corresponding to another scratch area 248 of the saved memory image, indicating the proper and eventual locations of the temporarily stored data pages. Any other information potentially needed by the awaken loader is located in further temporary memory pages.

FIG. 10 illustrates awaken loader function of restoring the temporary pages to their correct locations, overwriting the previous locations of the operating system memory loader 240.

Returning again to FIG. 2, the awaken loader then performs step 132, which comprises restoring the boot system processor's execution context (which was previously recovered from the hibernation file in step 220). Step 118 then examines the hibernate variable and finds it equal to 0, indicating that the processor is awakening rather than hibernating. Accordingly, step 134 is performed of resuming any processes that were interrupted for hibernation.

Figure 11:
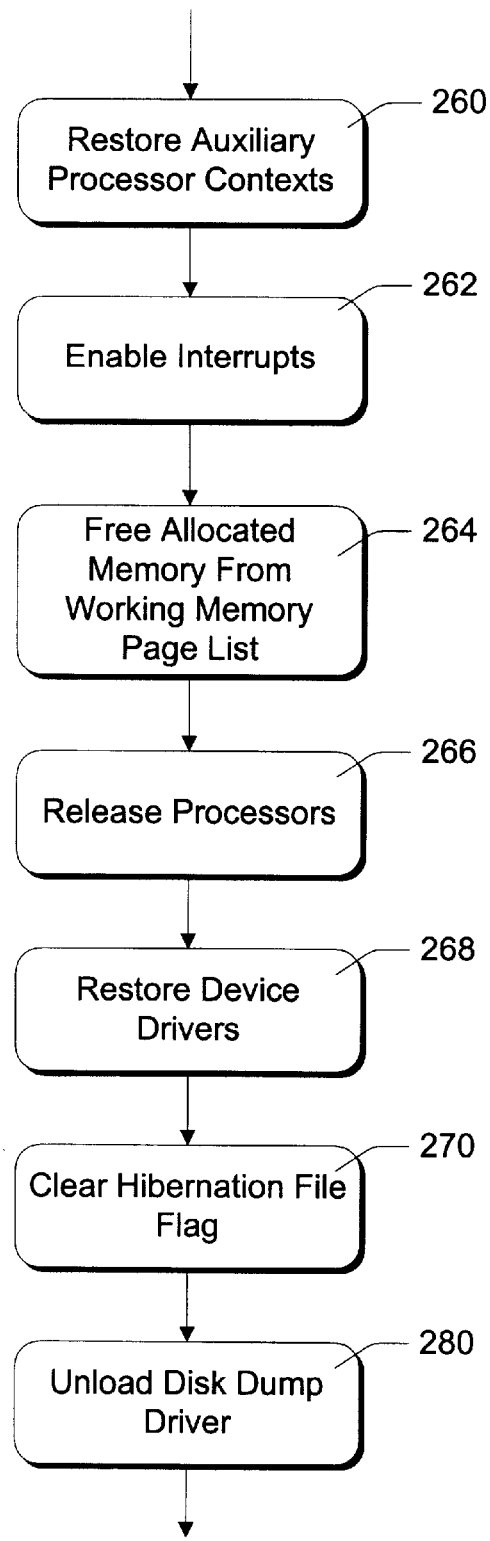
FIG. 11 illustrates steps performed by an awaken loader in accordance with the steps of FIG. 10.

FIG. 11 shows further steps represented in general by block 134 of FIG. 2. A step 260 comprises restoring the contexts of any auxiliary system processors. Step 262 comprises enabling interrupts for both the boot system processor and the auxiliary system processors. Step 264 comprises freeing the memory that was previously allocated in the hibernation process. This memory is identified from the hibernate working memory page list.

Step 266 comprises releasing all processors from their high-priority loops, so that they can continue one with their previous activities. Step 268 comprises notifying device drivers to restore their devices and continue normal operation. Step 270 comprises clearing the flag in the hibernation file, indicating that the hibernation file is no longer valid. Step 280 comprises unloading the disk dump driver, which was loaded during the hibernation process.

The invention provides a hardware independent hibernation function that can be implemented in an operating system. The hibernation function allows a computer to quickly save its operating state to be powered off, and to quickly restore that state after the computer is turned back on.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of temporarily suspending a computer's program execution comprising:

booting an operating system from secondary storage and executing the operating system from volatile executable memory;

executing one or more application programs from the volatile executable memory in conjunction with the operating system;

identifying areas of executable memory that will potentially change during a subsequent saving step;

creating duplicate areas in the volatile executable memory corresponding to the identified areas of the executable memory;

from the operating system booted from secondary storage, saving contents of the volatile executable memory and processor register states to secondary storage prior to a computer power-down;

during the saving step, writing the duplicate areas to secondary storage in place of the identified areas;

halting execution of the operating system and of the one or more application programs prior to the computer power-down;

after the computer power down, restoring the volatile executable memory and processor register states from secondary storage and restarting the operating system and one or more application programs.

2. A method as recited in claim 1, further comprising:

using a primary device driver for secondary storage except during the saving step;

using a simplified device driver for the secondary storage during the saving step.

3. A method as recited in claim 1, further comprising instructing operating system device drivers to save their state information to volatile executable memory before performing the saving step.

4. A method as recited in claim 1, further comprising:

pre-allocating executable memory prior to the computer power-down for use in restoring the volatile executable memory and processor register states after the computer power-down.

5. A method as recited in claim 1, wherein the restoring comprises:

executing an operating system loader from the executable memory;

retrieving areas of executable memory data from secondary storage along with physical memory addresses of the areas, the physical memory addresses designating where in the executable memory the areas are to be restored;

restoring the retrieved areas to the executable memory, wherein any retrieved areas having physical addresses within the operating system loader portions of the executable memory are written to pre-allocated areas of the executable memory;

executing an awaken loader which copies the pre-allocated areas of the executable memory to the operating system loader portions of the executable memory to restore retrieved areas having physical addresses within the operating system loader portions of the executable memory.

6. In a computer that retrieves and executes instructions from volatile executable memory, a method of temporarily suspending instruction execution and saving volatile executable memory state to non-volatile secondary storage prior to a computer power-down, comprising the following steps:

identifying areas of the volatile memory that will potentially change during a subsequent saving step, the identified areas having physical addresses in the volatile memory;

creating duplicate areas in the volatile memory corresponding to the identified areas of the volatile memory;

saving contents of respective areas of volatile memory along with their physical memory addresses to non-volatile secondary storage; wherein the duplicate areas are written in the place of the corresponding identified areas, along with the physical addresses of the identified areas corresponding to the duplicate areas.

7. A method as recited in claim 6, further comprising a step of allocating memory from an operating system for the duplicate areas of memory.

8. A method as recited in claim 6, wherein the steps are performed by an operating system that executes from the volatile executable memory.

9. A method as recited in claim 6, wherein the steps are performed by instructions that execute from the volatile executable memory.

10. A method as recited in claim 6, further comprising the following additional steps:

allocating memory from an operating system for the duplicate areas of memory;

pre-allocating further memory from the operating system for use in a subsequent restoration procedure after the computer power-down.

11. A method as recited in claim 6, wherein the saving step uses a simplified device driver that writes only to limited areas of the volatile executable memory.

12. A computer comprising:

volatile executable memory;

non-volatile secondary storage;

a processor that retrieves and executes instructions from the volatile executable memory, such instruction execution resulting in a changing processor state and a changing executable memory state;

the processor being programmed to perform a hibernate function prior to a computer power-down, the hibernate function comprising the following steps:

identifying areas of the volatile memory that will potentially change during a subsequent saving step, the identified areas having physical addresses in the volatile memory;

creating duplicate areas in the volatile memory corresponding to the identified areas of the volatile memory;

saving contents of respective areas of volatile memory along with their physical memory addresses to the non-volatile secondary storage; wherein the duplicate areas are written in the place of the identified areas, along with the physical addresses of the identified areas corresponding to the duplicate areas.

13. A computer as recited in claim 12, the hibernate function comprising the following additional step:

allocating memory from an operating system for the duplicate areas of memory.

14. A computer as recited in claim 12, further comprising an operating system that executes from the volatile executable memory, wherein the operating system implements the hibernate function.

15. A computer as recited in claim 12, wherein the hibernate function is implemented by instructions that execute from the volatile executable memory.

16. A computer as recited in claim 12, wherein the hibernate function comprises the following additional steps:

allocating memory from an operating system for the duplicate areas of memory;

pre-allocating further memory from the operating system for use in a subsequent restoration procedure after the computer power-down.

17. A computer as recited in claim 12, wherein the saving step uses a simplified device driver that writes only to limited areas of the volatile executable memory.

18. One or more computer-readable storage media containing instructions that execute from volatile memory in a computer, the instructions being executable to perform steps comprising:

identifying areas of volatile memory that will potentially change during a subsequent saving step, the identified areas having physical memory addresses in the volatile memory;

creating duplicate areas in the volatile memory corresponding to the identified areas of the volatile memory;

saving contents of respective areas of volatile memory along with their physical memory addresses to non-volatile secondary storage; wherein the duplicate areas are written in the place of the corresponding identified areas, along with the physical addresses of the identified areas corresponding to the duplicate areas.

19. One or more computer-readable storage media as recited in claim 18, the instructions performing a further step comprising allocating memory from an operating system for the duplicate areas of memory.

20. One or more computer-readable storage media as recited in claim 18, the instructions performing further steps comprising:

allocating memory from an operating system for the duplicate areas of memory;

pre-allocating further memory from the operating system for use in a subsequent restoration procedure after a computer power-down.

21. One or more computer-readable storage media as recited in claim 18, wherein the saving step uses a simplified device driver that writes only to limited areas of the volatile memory.

22. In a computer that retrieves and executes instructions from volatile executable memory, a method of restoring executable memory and restarting instruction execution after a computer power-down, comprising the following steps:

executing an operating system loader from the executable memory;

retrieving areas of executable memory data from secondary storage along with physical memory addresses of the areas, the physical memory addresses designating where in the executable memory the areas are to be restored;

restoring the retrieved areas to the executable memory, wherein any retrieved areas having physical addresses within the operating system loader portions of the executable memory are written to areas of the executable memory that were pre-allocated prior to the computer power-down;

executing an awaken loader which copies the pre-allocated areas of the executable memory to the operating system loader portions of the executable memory to restore retrieved areas having physical addresses within the operating system loader portions of the executable memory.

23. A computer comprising:

volatile executable memory;

non-volatile secondary storage;

a processor that retrieves and executes instructions from the executable memory, such instruction execution resulting in a changing processor state and a changing executable memory state;

an operating system loader from known locations of executable memory;

wherein the operating system loader performs steps comprising:

retrieving areas of executable memory data from non-volatile secondary storage along with physical memory addresses of the retrieved data areas, the physical addresses designating where in the executable memory the data areas are to be restored;

restoring the retrieved data areas to the executable memory, wherein any retrieved areas having physical addresses within the operating system loader portions of the executable memory are written to pre-allocated areas of the executable memory;

an awaken loader which copies the pre-allocated areas of the executable memory to the operating system loader portions of the executable memory to restore retrieved areas having physical addresses within the operating system loader portions of the executable memory.

24. One or more computer-readable storage media containing instructions that execute from volatile memory in a computer, the instructions being executable to perform steps comprising:

executing an operating system loader from known locations of executable memory;

retrieving areas of executable memory data from non-volatile secondary storage along with physical memory addresses of the retrieved data areas, the physical addresses designating where in the executable memory the data areas are to be restored;

restoring the retrieved data areas to the executable memory, wherein any retrieved areas having physical addresses within the operating system loader portions of the executable memory are written to pre-allocated areas of the executable memory;

executing an awaken loader which copies the pre-allocated areas of the executable memory to the operating system loader portions of the executable memory to restore retrieved areas having physical addresses within the operating system loader portions of the executable memory.

25. A method of temporarily suspending and restarting a computer's program execution, comprising the following steps:

identifying areas of executable memory that will potentially change during a subsequent saving step;

halting program execution prior to a computer power-down;

creating duplicate areas in executable memory corresponding to the identified areas of the executable memory;

saving contents of the executable memory and processor register states to secondary storage prior to a computer power-down;

wherein the saving step comprises writing the duplicate areas to secondary storage in place of the identified areas;

after the computer power down, executing an operating system loader;

the operating system loader retrieving areas of executable memory data from secondary storage along with physical memory addresses of the areas, the physical memory addresses designating where in the executable memory the areas are to be restored;

the operating system restoring the retrieved areas to the executable memory, wherein any retrieved areas having physical addresses within the operating system loader portions of the executable memory are written to pre-allocated areas of the executable memory;

executing an awaken loader which copies the pre-allocated areas of the executable memory to the operating system loader portions of the executable memory to restore retrieved areas having physical addresses within the operating system loader portions of the executable memory.

26. A method as recited in claim 25, wherein the recited steps are performed by an operating system that executes from the executable memory.

27. A method as recited in claim 25, wherein the recited steps are performed by instructions that execute from the executable memory.

28. A method as recited in claim 25, further comprising the following additional steps:

allocating memory from an operating system for the duplicate areas of memory;

pre-allocating further memory from the operating system for subsequent use by the operating system loader.

29. A method as recited in claim 25, wherein the saving step uses a simplified device driver that writes only to limited areas of the executable memory.

* * * * *